March 1, 1960 J. C. VAN RIJN 2,926,838
VENTILATING MOTOR AND FAN
Filed Oct. 7, 1958 2 Sheets-Sheet 2
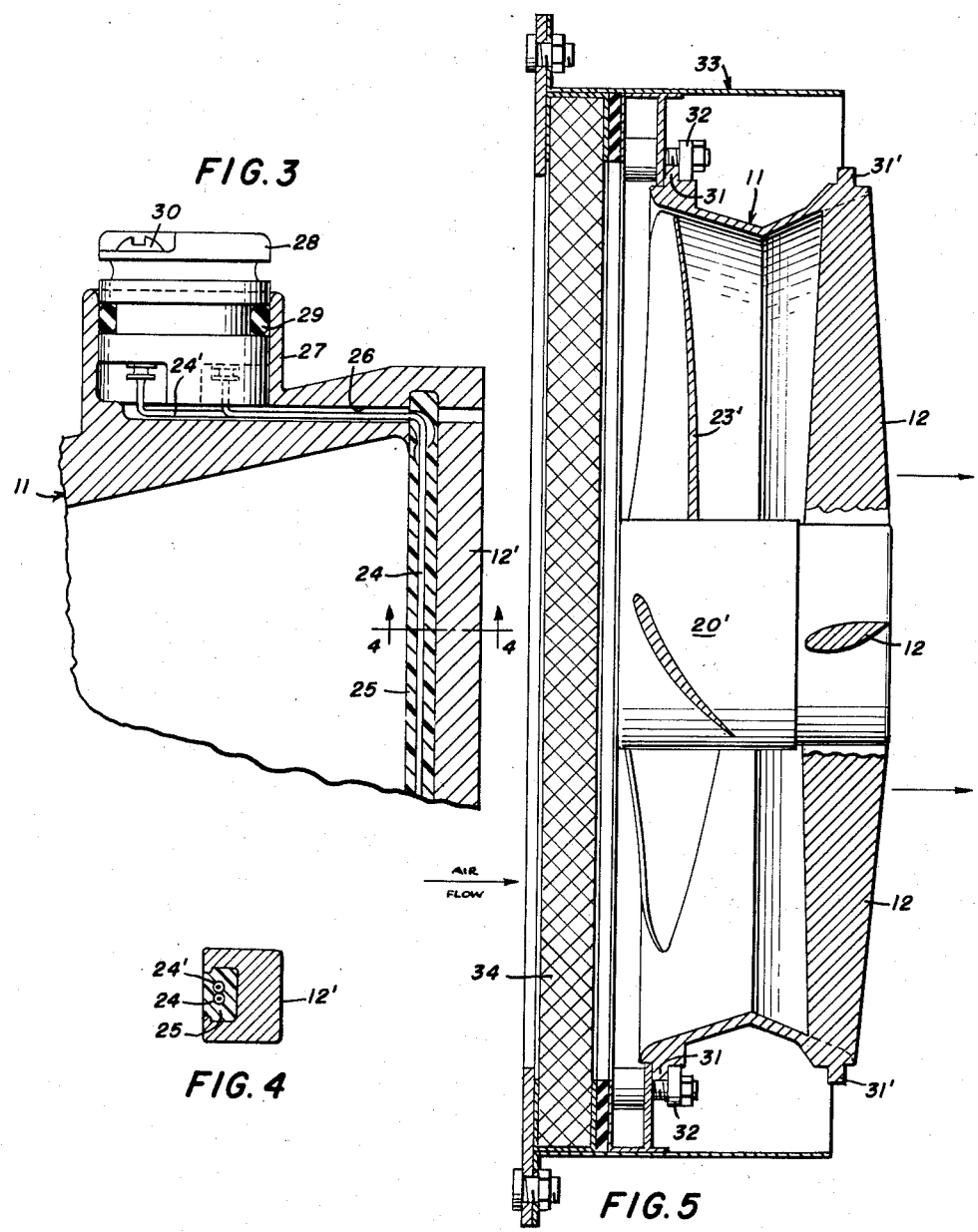
INVENTOR
JACOBUS C. VAN RIJN
BY *Andros and Smith*
ATTORNEY

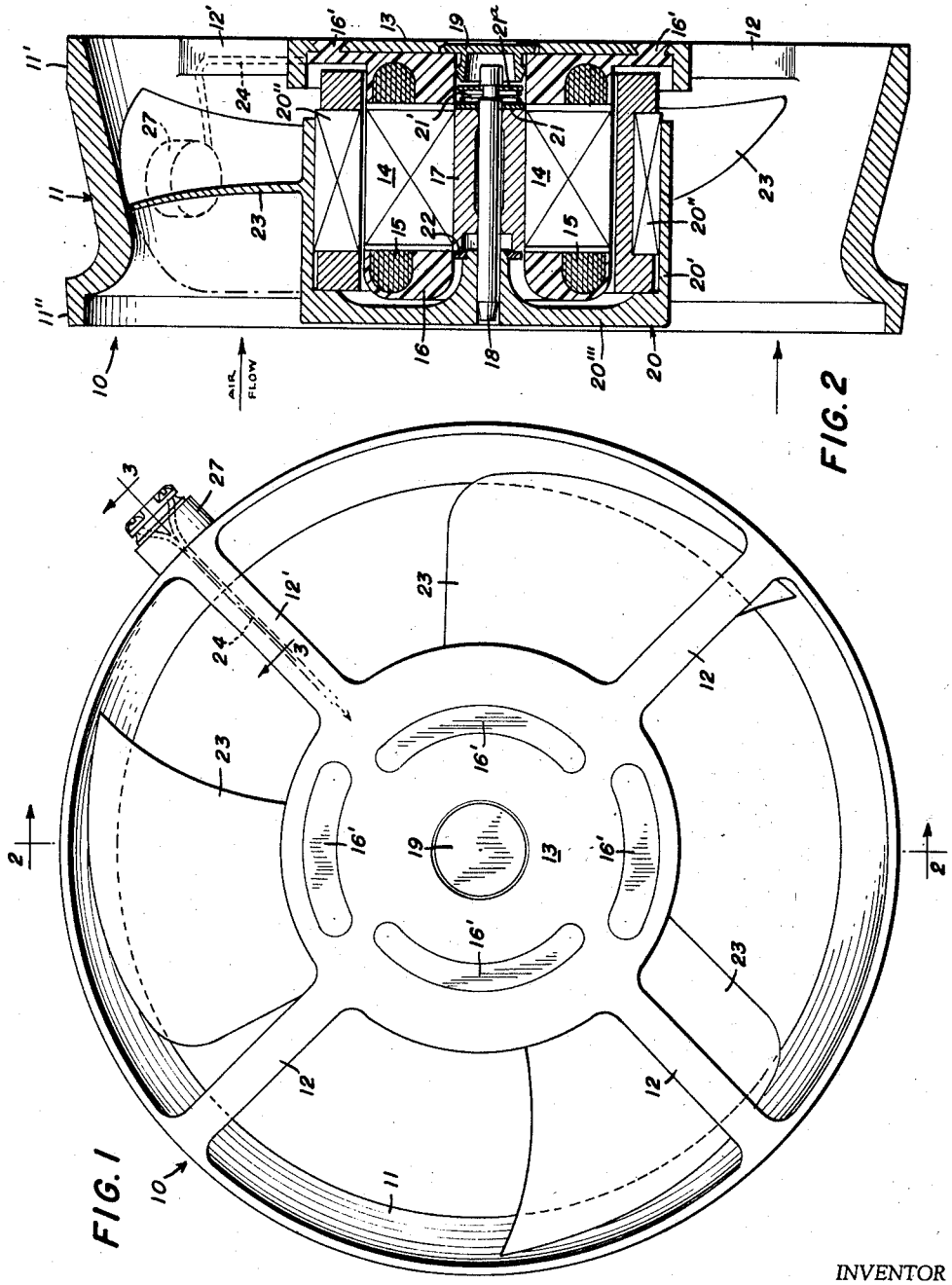

United States Patent Office 2,926,838
Patented Mar. 1, 1960

2,926,838

VENTILATING MOTOR AND FAN

Jacobus Constant Van Rijn, Woodstock, N.Y.

Application October 7, 1958, Serial No. 765,811

8 Claims. (Cl. 230—117)

This invention relates to fans and more specifically to fans to ventilate and cool electronic installations such as are mounted in small enclosed spaces. It is highly desirable to make such electronic "packages" as small and compact as possible especially if they are to be used in airplanes where space is at a premium. It is evident that when electronic devices are enclosed, the heat liberated in their use is considerable and, if not dissipated or carried away would cause excessive temperatures to develop in the package.

In order to develop a flow of air through an electronic package a fan is required which will have the ability to move the high c.f.m. of air required to carry away the heat, yet occupy a minimum of space and be as light weight as possible.

It is, therefore, a primary object of the present invention to provide a fan of small size, light weight, and of high capacity.

It is a further object of the invention to provide a simple and inexpensive fan assembly that is easily mounted for use, which may be readily remounted to give the reverse direction of air flow, and which may be readily replaced by a like fan assembly.

It is a still further object of the present invention to provide a two piece fan assembly in which a portion of the motor and the frame is made substantially integrally, and the remainder of the motor and the fan per se is made substantially integrally.

Other and further objects and advantages will become apparent from the following specification taken with the accompanying drawings in which like characters of reference refer to similar parts in the several views and in which:

Fig. 1 is an elevation of one exemplification of the fan of the present invention looking from the down stream side;

Fig. 2 is a section taken on line 2—2 of Fig. 1;

Fig. 3 is a partial section taken on line 3—3 of Fig. 1;

Fig. 4 is a section taken on line 4—4 of Fig. 3; and

Fig. 5 is a section similar to Fig. 2 but of an alternative fan of the invention and showing the use of a filter.

In Figs. 1 and 2 the fan designated generally at 10 is made up of a frame, including a mounting preferably formed as a mounting ring 11, a plurality of stationary spoke-like means 12, one of which 12' also acts as a conduit for electrical connections to the motor. While four spoke-like means 12 have been shown, any other number may be selected (one or more) but three or four are preferred.

The stationary spoke-like means terminate at their inner end in a motor support element shown as a flanged disc 13. On this motor support a stator, comprising laminae 14 and windings 15, is mounted. The mounting consists of a plastic material 16 that envelops the ends of the stator and at one end is formed with portions 16' that interlock with the flanged dish-like motor support 13.

A bearing means 17 is mounted rigidly centrally of the stator as, for instance, by a press fit in a bore passing through the stator. The inner surface of bearing means 17 is the bearing surface for the rotor shaft 18. A dust cap or cover element 19 covers the end of the bore at the motor support. Removal of this cover element 19 gives access to the end of shaft 18 that extends through the bearing means 17 from the rotor element 20. Appropriate shaft retaining and thrust washer 21, backed up by a spring 21' and held in place by a snap ring 21a is accessible through removal of cover element 19 to provide for assembly and disassembly of shaft 18 in bearing 17.

Rotor element 20 is cup shaped, the cylindrical wall 20' of which is the motor armature and includes laminae 20".

Shaft 18 is mounted centrally of and rigidly secured to the bottom 20''' of cup shaped rotor 20. A sealing washer or end bearing 22 is provided. It will be noted from the above that the axial length of the motor is held to no more than the length of the stator winding plus the necessary minimum thickness for the motor support 13, the minimum thickness for the bottom of the cup shaped rotor 20 and the very small required end clearance. This axial length of the motor corresponds to the axial length of the mounting ring 11.

From the outer surface of the rotor 20 a plurality of fan blades 23 extend to the mounting ring 11. Axially, these blades 23 extend substantially the length of the rotor 20. However, the outer ends of the blades have greater axial extent than the inner ends, and the ends of the blades lie in a helix following the surface of the mounting ring. This structure of the blades and mounting ring increases the static head at which the normal stall-point of the fan occurs (centrax) and provides for both centrifugal action as well as diffusion by the diverging angle of the surface of the mounting ring.

Figs. 3 and 4 show a preferred manner of bringing the leads for the motor from the motor to an electrical terminal on the outer surface of the venturi ring. Electrical leads 24, 24' are shown as encased in a rubber like element 25. One of the spoke-like supports or struts 12', as seen in Fig. 4, is formed with a groove shaped to receive and retain the element 25 encasing the leads. At the outer end of the spoke-like element 12' the leads 24, 24' extend through a passage 26 into the bottom of a cylindrical receptacle 27 which may be formed as a part of the mounting ring structure. Leads 24 and 24' are secured to a plug element 28 that may be placed in cylindrical receptacle 27 and which may be sealed into the receptacle by O-ring 29.

At the outer end of plug element 28 are terminals 30 which are to be connected to a source of electric power, not shown.

At the motor end the rubber-like element 25 extends into the dish-like element 13 and the leads 24, 24' pass through the plastic material 16 to the windings 15.

It will be noted that the surfaces 11' and 11" at the ends of the mounting ring are identical. These surfaces are provided as mounting surfaces that wedgingly engage in a similarly shaped aperture. By having the two ends of identical shape at 11' and 11" the fan may be used to blow in either direction, that is, its direction of fanning may be reversed by reversal of the fan in the aperture in which it is to be mounted.

The fan shown in Fig. 5 is provided with a different type of mounting at the ends of the mounting ring. Flanges 31, 31' being identical in size and relative location to the end of the mounting ring 11 may either one be clamped by elements 32. This fan, therefore, may also be reversed by turning it end for end.

As seen in Fig. 5 the fan assembly may be mounted in a casing 33 of any desired construction and in which a filter 34 may be also mounted. The filter 34 is preferably mounted on the upstream side of the fan arranged to blow air into the space to be cooled so that the filter can be readily replaced as it becomes clogged and in order that the space to be cooled may be under a slightly higher pressure than the surrounding air to avoid seepage of dust through any small openings in the enclosure of the space to be cooled.

It will further be noted that the tapered mounting surfaces 11, 11' may be used in Fig. 5 or the flanges 31, 31' may be used in Fig. 1.

Both Fig. 1 and Fig. 5 show mounting ring 11 as having an interior surface that converges to a minimum radius then diverges. As explained above in connection with Fig. 1, the fan blades not only act as normal for blades to provide axial flow but also, in conjunction with the divergent mounting ring, give rise to centrifugal action. In the arrangement of Fig. 5 the minimum radius occurs about mid point of the mounting ring and in this case the structure has the effect of a nozzle and provides principally axial flow.

It has been found, regardless what the reason for it is, that comparing fans of identical size and power, one as seen in Fig. 1, and the other as seen in Fig. 5, the fan using the mounting in accordance with Fig. 1 can provide air at a higher pressure than the fan using the mounting ring according to Fig. 5. And the fan using the mounting ring in accordance with Fig. 5 can provide a greater volume of flow that the fan using the mounting ring according to Fig. 1.

It will, of course, be apparent to the skilled mechanic that various modifications may be made in the present invention from the specific exemplifications described above without departing from the scope thereof as defined in the appended claims.

Having described my invention what I claim as new and desire to secure by Letters Patent is:

1. A ventilating fan assemblage comprising a mounting ring of limited axial exetnt, at least one spoke-like support at one end of said mounting ring extending generally radially inwardly thereof and lying within the axial length of said mounting ring, at one axial end of said mounting ring, an electric motor end plate mounted on said spoke-like support centrally of said mounting ring, a stator element secured to said end plate and of a length to lie entirely within the axial length of said mounting ring, a central bore through said stator coaxial with said mounting ring, coaxial bearing means mounted in said bore, a cup shaped element including a peripheral wall forming an armature for cooperation with said stator, a shaft fixed in said cup shaped element coaxially thereof for cooperation with said bearing means to support said armature in cooperating position with respect to said stator the axial length of said cup shaped element being less than the axial length of said mounting ring so as to lie between the axial ends of said mounting ring, and a plurality of fan blades mounted on said armature and extending generally radially outwardly thereof, the ends of said fan blades lying in a helix closely following the inner surface of said mounting ring.

2. The ventilating fan assemblage of claim 1 in which electric leads connect to said stator, said support being formed with a groove extending from said stator to said mounting ring, and a strip of rubber-like material having an exterior shape to snugly fit said groove, said electrical leads being mounted within said rubber-like strip.

3. The ventilating fan assemblage of claim 1 in which identical mounting means are provided at each end of said mounting ring whereby the direction of action of said fan may be reversed by reversal of said assemblage.

4. The ventilating fan assemblage of claim 1 in which the direction of flow of air caused by said fan blades is toward said spoke-like support.

5. The ventilating fan assemblage of claim 4 in which the interior surface of said mounting ring converges to a minimum radius between the ends of said mounting ring and diverges from said minimum radius in the direction of flow of air.

6. The ventilating fan assemblage of claim 5 in which said minimum radius is located adjacent the end of said mounting ring remote from said spoke-like support.

7. The ventilating fan assemblage of claim 5 in which said minimum radius is located approximately at the mid-point of the axial length of said mounting ring.

8. A ventilating fan assembly comprising a mounting ring of limited axial extent, at least one spoke-like support extending generally radially inwardly thereof at one axial end of said mounting ring, a central disc supported coaxially of said mounting ring by said spoke-like support, an electric motor stator, a mounting for said stator on said central disc consisting of a plastic material that envelops the end of said stator adjacent said disc and is secured to said disc, a bore coaxial of said electric motor stator and extending substantially therethrough, bearing means in said bore, a cup shaped element including a peripheral wall formed as an armature for cooperation with said electric motor stator, a shaft mounted axially in said cup shaped element for cooperation with said bearing means to rotatably mount said armature with respect to said stator, and a plurality of fan blades mounted on the outer surface of said cup shaped armature extending generally radially and having their ends shaped to rotate in close proximity to the inner surface of said mounting ring.

References Cited in the file of this patent
UNITED STATES PATENTS

| | | |
|---|---|---|
| 2,441,239 | Flanders | May 11, 1948 |
| 2,609,055 | Monroe | Sept. 2, 1952 |
| 2,742,223 | Font | Apr. 17, 1956 |